United States Patent [19]
Eskeli

[11] 3,889,471
[45] June 17, 1975

[54] DUAL ROTOR DUAL FLUID TURBINE

[76] Inventor: Michael Eskeli, 7994-41 Locke Lee, Houston, Tex. 77042

[22] Filed: Nov. 6, 1973

[21] Appl. No.: 413,258

[52] U.S. Cl. .................................. 60/655; 60/682
[51] Int. Cl. ..................... F01k 25/00; F01k 23/02
[58] Field of Search ..................... 60/682, 650, 655

[56] References Cited
UNITED STATES PATENTS
3,791,167   2/1974   Eskeli ................................ 62/401

Primary Examiner—Martin P. Schwadron
Assistant Examiner—Allen M. Ostrager
Attorney, Agent, or Firm—Robert W. B. Dickerson

[57] ABSTRACT

A method and apparatus for generating power by compressing two fluids within a rotating rotor in heat exchange relationship with each other and then expanding said fluids in a second rotor for generation of said power. One of these fluids is used to elevate the temperature of the available heat by compression in said rotor and transferring heat to said other fluid which is also compressed but with lesser amount of temperature gain so that heat can be transferred to it from said warmer fluid; after compression and heat exchange, said fluids are passed to a second rotor for expansion and generation of power. Part of the power generated is used to rotate the compression rotor, and remainder is passed to shaft for use in a load. The two fluids used are usually gases, and the two fluids disclosed may be nitrogen and carbon dioxide. Heating is provided by a heating fluid which may be a liquid, or a gas. Cooling is also provided, and the cooling fluid may be liquid, such as water.

3 Claims, 6 Drawing Figures

PATENTED JUN 17 1975 889,471

DUAL ROTOR DUAL FLUID TURBINE

Cross Reference to Related Applications

The turbine of this invention uses and is a combination of two devices for which patents have been applied previously:

"Dual Rotor Heat Exchanger," filed Oct. 18, 1973, Ser. No. 407,665. "Turbine with Heating and Cooling," filed on or about Oct. 22, 1973, Ser. No. 408,381 now U.S. Pat. No. 3,834,179.

This invention relates generally to devices for generating power in response of a fluid being passed through a turbine.

There have been various types of turbines previously, and in some of these a fluid is accelerated in a stationary nozzle and passed then at high velocity to vanes mounted on a rotating rotor where the kinetic energy of the fluid is converted to power.

These conventional turbines normally require a pressurized fluid for their operation, and have high energy losses due to the high fluid velocities employed in said nozzles and vanes.

It is an object of this invention to provide a method and apparatus for generation of power wherein a low temperature heat source may be used to generate useful power. It is also an object to provide an apparatus for said power generation that is compact and which can be mounted within a fully closed casing, so that said casing may be evacuated for reduced fluid friction losses. It is also an object of this invention to provide an apparatus where heat exchangers containing a liquid heat exchange fluid are eliminated from the high speed areas near rotor periphery; said liquids generate very high pressures within such heat exchangers and are thus difficult to contain within said heat exchangers.

Figure 1:
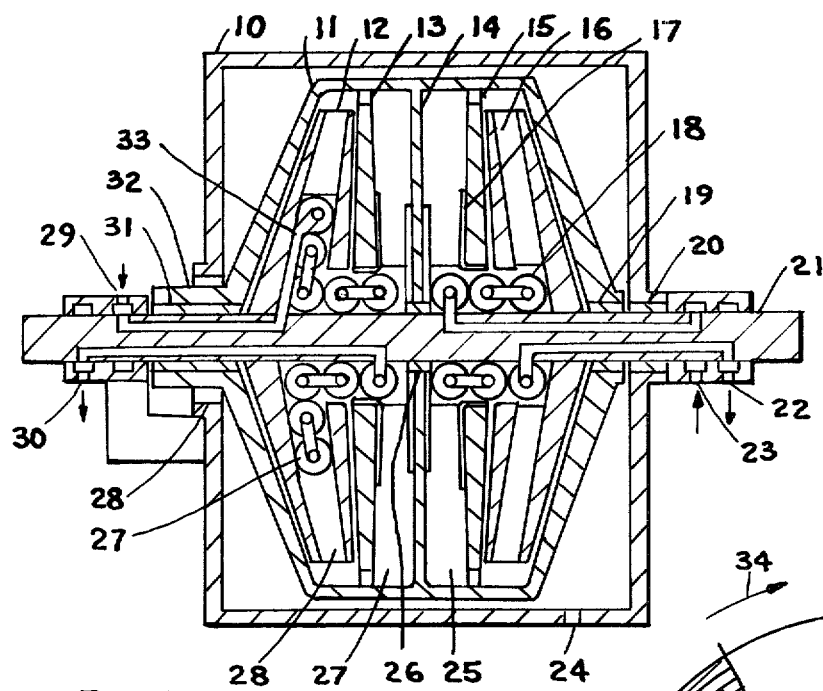
FIG. 1 is a cross section of the turbine.

Referring to FIG. 1, therein is shown a cross section of the turbine. In following, first fluid is the fluid receiving heat during compression and being the fluid generating power as its main function; second fluid is the fluid rejecting heat during compression with heat being transferred to said first fluid, and with the main function of said second fluid being to elevate the temperature of available heat to a higher value; third fluid being the fluid supplying heat to said second fluid; and fourth fluid being the fluid removing heat from said first fluid. Thus, said third fluid is the heat source for the turbine, and said fourth fluid serves as the heat sink for the turbine. In FIG. 1, 10 is casing, 11 is first rotor, 12 is second rotor, 13 are rotor nozzles for second fluid, 14 is heat conducting divider wall, 15 are rotor nozzles for said first fluid, 16 are second rotor vanes in first fluid inward passage, 17 is thermal insulation, 18 is cooling heat exchanger for first fluid, 19 is bearing and seal for first rotor, 20 is second rotor shaft 21 bearing and seal, 22 and 23 are fourth fluid outlet and inlet respectively to shaft 21 passages for distribution to heat exchanger 18, 24 is casing vent to which vacuum pump may be connected, 25 are vanes in first rotor first fluid outward passage with said vanes being either straight radial or being curved, 26 is a bearing and seal for said dividing wall 14, 27 are vanes for said second fluid which may be either radial or curved and are located within said first rotor 11, 28 are vanes located within said second rotor for inward passage of said second fluid and which may be either curved or radial, 27 is heating heat exchanger for adding heat to said second fluid, 28 is bearing and seal, 29 and 30 are inlet and outlet respectively for said third fluid entering passages within shaft 21, for distribution to heat exchanger 27, 31 is bearing and seal, 32 is first rotor shaft, 33 is third fluid entry conduit to heat exchanger 27.

Figure 2:
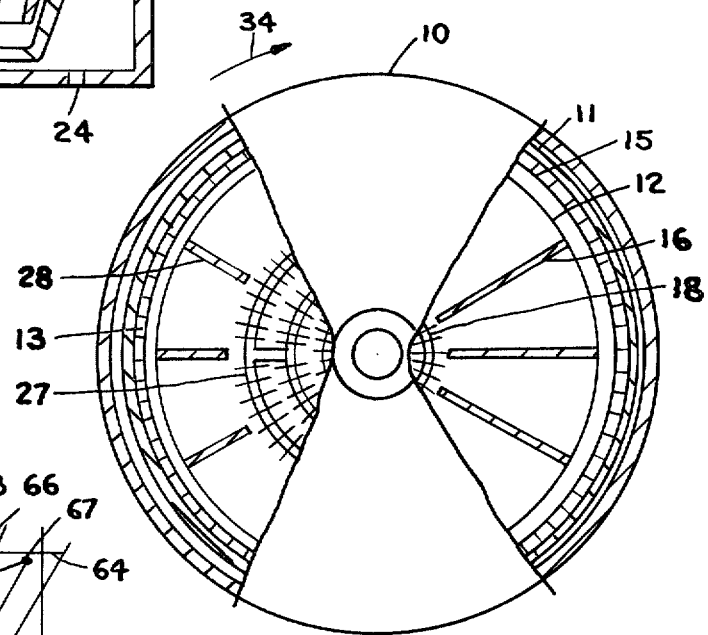
FIG. 2 is an end view of the unit shown in FIG. 1, with portions removed to show interior details.

In FIG. 2, an end view of the unit shown in FIG. 1 is illustrated, with portions removed to show interior details. 10 is casing, 11 is first rotor, 15 are nozzles for first fluid, 12 is second rotor, 16 are second rotor vanes for first fluid, 18 is cooling heat exchanger, 27 is heating heat exchanger, 13 are second fluid nozzles, 28 are second rotor vanes for second fluid, and 34 indicates direction of rotation for both rotors.

Figure 3:
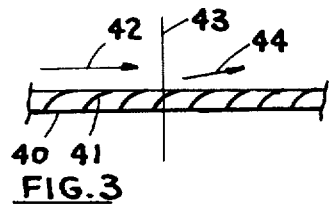
FIG. 3, is a detail showing rotor nozzles.

In FIG. 3, a detail of first rotor nozzles is shown. 40 is the wall which is part of first rotor, and into which said nozzles are mounted to discharge fluid from first rotor to second rotor, 41 are nozzles, 43 is direction axle about which the rotor rotates, 44 indicates direction of fluid leaving the nozzles. 42 indicates direction of rotation for first rotor for said first fluid; this direction is opposite for said second fluid. Thus, first fluid is discharged forward, and second fluid is discharged backward.

Figure 4:
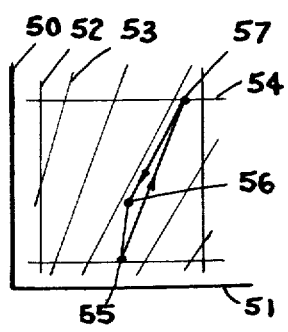
FIG. 4 and FIG. 5 are pressure-enthalpy diagrams for the working fluids.

In FIG. 4, a pressure-enthalpy diagram for said second fluid is shown, with the work cycle for said second fluid illustrated thereon. 50 is pressure line and 51 is enthalpy line, 52 is constant enthalpy line, 53 is constant entropy line, 54 is constant pressure line. Compression is from 55 to 57 with heat removal, expansion is from 57 to 56 and is isentropic, and further expansion is from 56 to 55 and is with heat addition thus closing the cycle.

Figure 5:
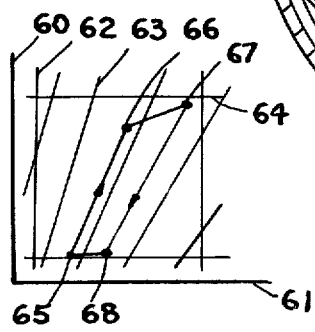

In FIG. 5, a pressure-enthalpy diagram for the first fluid is shown, with working cycle illustrated thereon. 60 is pressure line and 61 is enthalpy line, 62 is constant enthalpy line, 63 is constant entropy line, 64 is constant pressure line. Compression is from 65 to 66 with constant entropy and then from 66 to 67 with heat addition, expansion is from 67 to 68 with constant entropy and from 68 to 65 with heat removal, thus closing the cycle.

In operation, the two working fluids, said first fluid and said second fluid, are compressed by centrifugal action on said fluids by said first rotor with vanes 25 and 27 assuring that said fluids will rotate with said first rotor. During said compression, the pressure and temperature is increased for both fluids, and heat is transferred from said second fluid to said first fluid through heat conductive wall 14, and through heat conductive vanes 25 and 27. To provide for the needed temperature differential to transfer said heat, the two working fluids are selected so that said second fluid will have a greater temperature increase in the centrifugal force field of the first rotor than said first fluid. After compression, and heat addition, said first fluid is passed through nozzles 15 arranged to discharge said first fluid in forward direction that is in the direction of rotation thus increasing the absolute tangential velocity of said first fluid. Said first fluid is then passed to said second rotor first fluid passages at their outward ends with said passages extending inwardly toward rotor center and having vanes to ensure that said first fluid will rotate with said rotor and also for receiving work associated with the deceleration of said first fluid. After said deceleration and expansion, said first fluid is passed through a cooling heat exchanger for removal of heat, after which said first fluid is passed to said first rotor outward extending first fluid passages to be compressed thus completing said first fluid work cycle. Said second fluid is passed after compression and heat removal to nozzles 13 where said second fluid is discharged backward thus reducing the absolute tangential velocity of said second fluid. After passage through said nozzles 13, said second fluid enters said second rotor second fluid inward extending passageways where vanes 28 will assure that said second fluid will rotate with said second rotor and for receiving the work associated with deceleration of said second fluid. After initial isentropic expansion, a heating heat exchanger is provided within said second rotor for said second fluid for heat addition to said second fluid after and during said expansion, after which said second fluid is passed to said first rotor second fluid outward extending passageways for compression thus completing the work cycle for said second fluid.

The third fluid is circulated from external sources to said heating heat exchanger 27, and said heating fluid may be either a liquid or a gas. If a gaseous third fluid is used, heating may be either fully or partially obtained by compression and accompanying temperature increase of said third fluid within said heat exchanger 27. A liquid third fluid is normally at a suitable entry temperature to said heat exchanger 27; said third fluid may be for example water at a suitable temperature.

The fourth fluid is usually water from a suitable source, but air may also be used. After leaving said heat exchanger 18 by passing said fluid from exit 22 through external conduit to inlet 29; alternately, a suitable passage may be provided within shaft 21 to pass said fourth fluid to be used as said third fluid.

The second fluid is usually a gas, selected to provide the needed heating for said first fluid with a least work input to said turbine first and second rotor passage system for said second fluid and when using predetermined temperatures and pressures. The said first fluid is selected to provide for maximum work output from the turbine first and second rotor passage system for said first fluid and when using predetermined pressures and temperatures. Said first fluid and said second fluid are usually selected together for their physical properties. Suitable fluid combination is carbon dioxide at 100 psia at rotor center during operation, and at a 60F temperature, and nitrogen as said first fluid at 15 psia and 60F at rotor center, with first rotor tip speed 1650 feet/second. Other suitable fluids are propane, various other hydrocarbons and halogenated hydrocarbons as said second fluid and air, oxygen, carbon monoxide and others as said first fluid. The flow rates of said first fluid and said second fluid are adjusted within said rotor passages by sizing said nozzles 13 and 15, and said flow rates are usually set to provide for relatively slow radial fluid velocities; said radial velocities are maintained near rotor center below 150 feet/second, and are usually less in areas near the rotor periphery. These slow radial velocities provide for reduced friction lossed within said rotors, and allow for heat exchange to take place between the fluids within the several heat exchangers, and also allows for pressure build-up during said compression. Thus, the compression of said first fluid and said second fluid is nearly non-flow type. First rotor tip speed may be varied to suit.

Referring to FIG. 4, the work cycle diagram illustrates the compression of said second fluid, showing said compression to be with heat removal; this also will also tend to increase the second fluid pressure to a value that is higher than would be for adiabatic compression. The expansion of the second fluid is in part with heat addition, and this reduces the density of said second fluid during said expansion thus allowing for a higher first rotor tip speed at vanes 28. Thus, the work input is reduced to circulate said second fluid, first by removing heat during compression, and second by adding heat during expansion.

Referring to FIG. 5, the work cycle illustrated for said first fluid indicates that the heat addition for said first fluid is during last part of compression; this allows the main part of compression to be isentropic with a higher first fluid density and the expansion also is isentropic with heat removal after said expansion. This results in greater second rotor vane 16 tip speed, ant thus in greater work output.

The heat exchanger 27 is arranged to have parallel flow for the two fluids. The heat exchanger 18 is arranged to have counterflow for the two fluids. These arrangements are for best efficiency with low temperature third fluid, and are not mandatory for the functioning of the turbine.

The heat exchanger arrangement shown to transfer heat from said second fluid to said first fluid is by using a heat conductive wall, and rotor vanes being used as heat transfer fins. Other arrangements may be employed to transfer said heat, such as passing one of the fluids in finned tubes within passages for the other fluid, or other such means. These heat transfer arrangements are usually within existing art and are not further described herein. The location of the thermal insulation 17 is usually determined by desire to prevent heat transfer to the two fluids during early part of their compression for improved efficiency.

The turbine is constructed of heavy material sections and the walls of the rotors are usually thicker at rotor center to withstand the high rotational speeds required. The heat exchangers may be constructed from finned tubing as shown, or some other heat transfer arrangement may be used. The space between first rotor and second rotor walls is usually made narrow to prevent flow of fluid through said space; a gap of 0.005 inches is usually sufficient.

The first rotor will require power input to its shaft for operation, and the second rotor will produce power at its shaft. These two shafts are usually joined via suitable power transmission device to pass part of the power output of shaft 32 to shaft 21, with remainder of power output of shaft 32 being available for passage to an external load. Alternately, internal gearing could be provided to pass power from said second rotor to said first rotor.

Various gauges and governors are used with the turbine of this invention. They do not form a part of this invention and are not further described herein.

Figure 6:
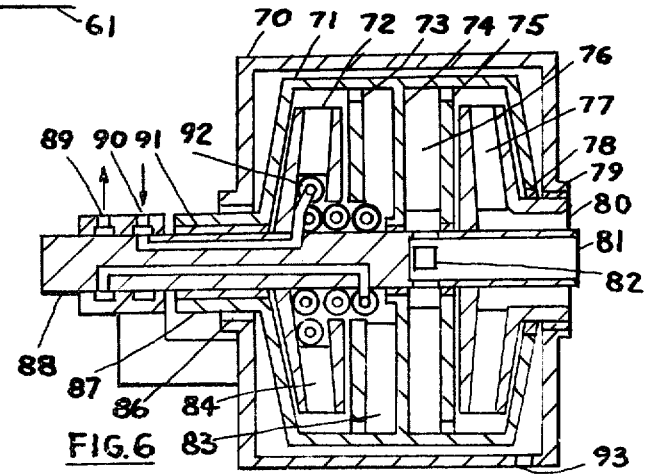
FIG. 6 is another form of the turbine.

The turbine in FIG. 6 is another form of the turbine. As noted hereinbefore, nitrogen at 15 psia is a suitable first fluid, and since air is similar to nitrogen, air also can be used as said first fluid. Use of air will eliminate also said fourth fluid and associated heat exchanger. In FIG. 6, 70 is casing, 71 is first rotor, 72 is second rotor, 73 are second fluid nozzles, 74 is dividing wall, 75 are first fluid nozzles, 76 are vanes for first fluid in first rotor outward extending passages, 77 are vanes for first fluid in second rotor inward extending passages, 78 is seal and bearing, 79 are bearings and seals, 80 is first fluid outlet, 81 is first fluid inlet to openings 82 through hollow shaft 88, 93 is casing vent, 83 are second fluid vanes in outward passage, 84 are second fluid passage vanes in second rotor, 86 is bearing and seal, 87 is first rotor shaft, 89 is third fluid outlet, 90 is third fluid inlet, 91 is bearing and seal, 92 is heat exchanger for adding heat to second fluid.

The operation of the unit shown in FIg. 6 is similar to that of unit shown in FIG. 1, except that outside air is used as the first fluid, thus eliminating the need for said fourth fluid. Power is supplied to first rotor shaft causing it to rotate, and power is obtained from the second rotor shaft. A means for starting the turbine is required. Heat is supplied by circulating from external sources a third fluid in heat exchange relationship with said second fluid in heat exchanger 92. Thermal insulation may be provided in manner similar to that shown in FIG. 1.

It should be noted that the tip speed of vanes 16 is normally greater than the tangential speed of nozzles 15; similarly, the tip speed of vanes 28 is normally less than the tangential velocity of nozzles 13. The tip speeds of these vanes can be conveniently adjusted by providing suitable outer radius for said second rotor; normally this means that the outside diameter of the second rotor is smaller in the second fluid section than in the first fluid section.

What is claimed is:

1. A turbine for generating power comprising:
    a. a casing for supporting shafts;
    b. first and second shafts journalled in bearings for rotation;
    c. a rotating first rotor mounted on said first shaft so as to rotate in unison therewith, said first rotor being adapted for high speed rotation and said first rotor having:
        i. radially outward extending first fluid passageways having vanes therewithin for ensuring that a first fluid therewithin rotates at the same rotational speed as said first rotor for effecting centrifugal compression and for effecting elevated pressure, said first fluid receiving heat during a part of said compression and after said compression with said vanes serving as heat exchange members and said vanes being made of heat conducting material, said radially outward extending first fluid passageways having first nozzles at their outward ends for passing said first fluid and discharging said first fluid in a forward direction that is in the direction of rotation thus increasing the absolute tangential velocity of said first fluid;
        ii. radially outward extending second fluid passageways having vanes therewithin for ensuring that a second fluid therewithin rotates with said first rotor for effecting centrifugal compression and for effecting elevated pressure and temperature, said second fluid having heat removed during said compression and having said heat transferred to said first fluid through heat conducting first rotor walls and with said vanes also serving as heat exchange members, said outward extending second fluid passageways also having second nozzles at their outward ends for passing said second fluid with said second nozzles arranged to discharge said second fluid backward thus reducing the absolute tangential velocity of said second fluid;
    d. a rotating second rotor mounted on said second shaft so as to rotate in unison therewith, said second rotor being adapted for high speed rotation, said second rotor having:
        i. radially inward extending passageways for said first fluid, said first fluid inward extending passageways adapted for receiving said first fluid being discharged from said first nozzles, said first fluid inward extending passageways having vanes therewithin for receiving by said second rotor the work associated with deceleration of said first fluid;
        ii. radially inward extending passageways for said second fluid, said second fluid inward extending passageways adapted for receiving said second fluid being discharged from said second nozzles of said first rotor, said second fluid inward extending passageways having vanes therewithin for receiving by said second rotor the work associated with the deceleration of said second fluid, said second fluid inward extending passageways being provided with heat exchanger means for adding heat to said second fluid during and after expansion of said second fluid within said second rotor, said heat exchanger means being provided with a heating fluid, said heating fluid being circulated in heat exchange relationship with said second fluid, said heating fluid being supplied from an entry via passageways near the axis of said second rotor and distributed to said heat exchanger means and then returned via further passages near the axis of said second rotor and then discharged, said second fluid being passed after said heat addition through passages near the second rotor axis to said outward extending second fluid passageways of said first rotor.

2. The turbine of claim 1 wherein said second rotor second fluid radially inward extending passage vanes tip speed is operably less than the tangential speed of said first rotor second fluid nozzles.

3. A method for generating power comprising:
    a. passing two gaseous fluids in heat exchange relationship with each other during and after compression within a rotating centrifuge; with one of said fluids receiving heat the other fluid having heat removed;
    b. expanding both fluids within a second rotor with extraction of work;
    c. adding heat to one of said fluids in a heat exchanger during and after expansion by circulating a heat exchange fluid within said heat exchanger for adding said heat; said heat exchange fluid being the fluid releasing heat to said other fluid during said compression.

* * * * *